US011013245B2

(12) United States Patent
Brunner et al.

(10) Patent No.: US 11,013,245 B2
(45) Date of Patent: *May 25, 2021

(54) WATER DISPERSIBLE FORMULATIONS

(71) Applicant: DSM IP ASSETS B.V., Heerlen (NL)

(72) Inventors: Dominik Josef Brunner, Kaiseraugst (CH); Laure Clasadonte, Kaiseraugst (CH); Christine Gothscheck, Kaiseraugst (CH); Olivia Brigitte Vidoni, Kaiseraugst (CH); Silvia Maria Wollgast, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/485,651

(22) PCT Filed: Feb. 9, 2018

(86) PCT No.: PCT/EP2018/053336
§ 371 (c)(1),
(2) Date: Aug. 13, 2019

(87) PCT Pub. No.: WO2018/149755
PCT Pub. Date: Aug. 23, 2018

(65) Prior Publication Data
US 2020/0045995 A1    Feb. 13, 2020

(30) Foreign Application Priority Data
Feb. 14, 2017 (EP) ..................... 17156103

(51) Int. Cl.
| *A23K 20/105* | (2016.01) |
| *A23K 20/158* | (2016.01) |
| *A23K 20/163* | (2016.01) |
| *A23K 20/28* | (2016.01) |
| *A23K 40/30* | (2016.01) |
| *A23K 50/10* | (2016.01) |
| *A23K 20/10* | (2016.01) |
| *A23K 20/111* | (2016.01) |
| *A23K 20/132* | (2016.01) |

(52) U.S. Cl.
CPC .......... *A23K 20/105* (2016.05); *A23K 20/158* (2016.05); *A23K 20/163* (2016.05); *A23K 20/28* (2016.05); *A23K 40/30* (2016.05); *A23K 50/10* (2016.05)

(58) Field of Classification Search
CPC .... A23K 20/10; A23K 20/111; A23K 20/132; A23K 20/158; A23K 20/163; A23K 20/28; A23K 40/30; A23K 50/10; A23K 20/105; A23K 40/10; Y02P 60/56; Y02P 60/50
See application file for complete search history.

(56) References Cited

U.S. PATENT DOCUMENTS

| 4,775,540 A | 10/1988 | Hertel et al. |
| 5,719,103 A * | 2/1998 | Dao ............ A01N 25/34 504/361 |
| 2007/0254070 A1 | 11/2007 | Epouse Alric et al. |
| 2019/0343149 A1 * | 11/2019 | Gadient ........... A23K 20/111 |
| 2020/0046649 A1 * | 2/2020 | Brunner ........... A23K 20/28 |

FOREIGN PATENT DOCUMENTS

WO    2012/084629    6/2012

OTHER PUBLICATIONS

International Search Report for PCT/EP2018/053336, dated Apr. 26, 2018, 3 pages.
Written Opinion of the ISA for PCT/EP2018/053336, dated Apr. 26, 2018, 7 pages.

* cited by examiner

*Primary Examiner* — Jeffrey T. Palenik
(74) *Attorney, Agent, or Firm* — Nixon & Vanderhye P.C.

(57) ABSTRACT

The present invention relates to water dispersible formulations of 3-nitrooxypropanol and derivatives thereof as well as to the production of such formulations.

17 Claims, No Drawings

WATER DISPERSIBLE FORMULATIONS

This application is the U.S. national phase of International Application No. PCT/EP2018/053336 filed 9 Feb. 2018, which designated the U.S. and claims priority to EP Patent Application No. 17156103.8 filed 14 Feb. 2017, the entire contents of each of which are hereby incorporated by reference.

The present invention relates to water dispersible formulations of 3-nitrooxypropanol and derivatives thereof as well as to the production of such formulations.

The temperature of the air surrounding the earth is increasing, a process referred to as global warming. One of the main focuses to reduce this warming effect is to reduce the amount of greenhouse gases emitted into the atmosphere. Greenhouse gases are emitted from several different sources, both natural and artificial; however, the two sources with the most emphasis are the agricultural and fossil fuel industries. Within agriculture, ruminants and in particular cattle are the major contributors to the biogenic methane formation, and it has been estimated that the prevention of methane formation from ruminants would almost stabilize atmospheric methane concentrations.

3-Nitrooxy propanol and structural analogues thereof have been reported to be highly efficient in reducing the formation of methane in ruminants without affecting microbial fermentation in a way that would be detrimental to the host animal (WO2012/084629).

However, 3-nitrooxypropanol and structural analogues thereof are rather volatile and are thus preferably supplemented via an appropriate carrier system which however needs to be easily and homogeneously applicable to the respective feed, preferably in the form of an aqueous dispersion which can be admixed or sprayed onto the feed.

Thus, there is an ongoing need to develop a product form which itself has a good flowability while being at the same time easily dispersible in an aqueous solution and which can readily be admixed with or sprayed onto other components commonly used in feed products for ruminants.

Surprisingly, it has been found that powderous formulations comprising 3-nitrooxypropanol adsorbed on precipitated silica are free flowing powders which easily disperse in aqueous solutions and can thus readily be used in the preparation of feed products for ruminants.

Thus, in a first embodiment the present invention relates to water dispersible powderous formulation (I) comprising
(i) at least 0.1 weight-% (wt-%), based on the total weight of the powderous formulation, of a compound of formula (I)

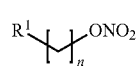

formula (I)

wherein
n is an integer from 1 to 15,
$R^1$ is selected from the group consisting of H, $C_1$-$C_6$alkyl, phenyl, —OH, —NH$_2$, —CN, —COOH, —O(C=O)R$^8$, —NHC(=O)R$^8$, SO$_2$NHR$^8$, and —ONO$_2$, and
$R^8$ is $C_1$-$C_6$alkyl, phenyl, pyridyl such as preferably 2-pyridyl
with the proviso that when n is >3 the hydrocarbon chain may be interrupted by —O— or —NH—.

(ii) 0 to 40 wt-%, based on the total weight of the powderous formulation, of an edible oil, and
(iii) at least 25 wt-%, based on the total weight of the powderous formulation, of precipitated silica.

One of the key requirements of the water dispersible powderous formulation according to the present invention is that they should disperse in an aqueous medium within a short time period of, for example, less than three minutes, to form a smooth suspension without any coarse lumps or agglomerates.

The formulations according to the present invention are powders, which depending on the process of production as well as the storage conditions, the may comprise some water. The water content is usually below 7 wt-%, based on the total weight of the formulation. Therefore, a further embodiment of the present invention relates to formulations as described above, wherein 0 to 7 wt-%, based on the total weight of the formulation, of water is present.

The formulations according to the present invention may furthermore contain small amounts of customary additives commonly used in the preparation of powderous formulations for feed application. Therefore, a further embodiment of the present invention relates to formulations according to the present invention, wherein 0 to 5 wt-%, based on the total weight of the formulation, of an additive is present.

It is clear that in all embodiments of the present invention the addition of all the wt.-% always adds up to 100. However, it cannot be excluded that small amount of impurities or additives may be present such as e.g. in amounts of less than 5 wt.-%, preferably less than 3 wt.-% which are e.g. introduced via the respective raw materials or processes used.

Particular advantageous compounds of formula (I) in all embodiments of the present invention are compounds of formula (II) wherein n is an integer between 3 and 9 and $R^1$ is OH, COOH or —ONO$_2$ and with the proviso that if z is 4 the hydrocarbon chain may be interrupted by —NH— such as in particular the compounds of formula (II) $R^1$—(CH$_2$)$_2$—NH—(CH$_2$)$_2$—ONO$_2$ (II). Even more preferred are compounds of formula (I) wherein n is an integer between 3 and 9 and $R^1$ is OH, COOH or —ONO$_2$.

Even more advantageous compounds of formula (I) in all embodiments of the present invention are 3-nitrooxypropanol (CAS-No: 100502-66-7), 9-nitrooxynonanol, 5-nitroxy pentanoic acid (CAS 74754-56-6), 6-nitroxy hexanoic acid (CAS 74754-55-5), bis(2-hydroxyethyl)amine dinitrate (CAS 20830-49-3), 1,4-bis-nitrooxybutane (CAS 3457-91-8) and 1,5-bis-nitrooxypentane (CAS 3457-92-9). Most preferred in all embodiments of the present invention is the use of 3-nitrooxypropanol.

The compounds of formula (I) preferably have a boiling point below 250° C. at 760 Torr, preferably a boiling point between 100 and 200° C. at 760 Torr.

The compounds according to the present invention are known and either commercially available or can be prepared in analogy to the processes as e.g. disclosed in WO2012/084629.

The term precipitated silica is well known to a person skilled in the art and refers to silica which is produced by precipitation from a solution containing silicate salts. Precipitation is generally carried out by reacting an alkaline silicate solution with a mineral acid such as sulfuric acid in water.

In all embodiments of the present invention, preferably the precipitated silica has an average (mean) particle size D(v, 0.5)>200 µm. More preferably in all embodiments of the present invention the particle size is selected in the range of 200 µm to 400 µm, most preferably in the range of 250 µm to 380 µm such as in the range of 300 to 360 µm.

The particle sizes as given herein are measured by a Malvern Master Sizer 2000 following the recommendations outlined in ISO13320-1 for particle size analysis via laser diffraction methods (laser diffraction light scattering). During this laser diffraction measurement, particles are passed through a focused laser beam. The particles scatter light at an angle that is inversely proportional to their size. The angular intensity of the scattered light is then measured by a series of photosensitive detectors. The map of scattering intensity versus angle is the primary source of information used to calculate the particle size. For the measurement of the particular size of the precipitated silica according to the present invention, a dry powder feeder (Malvern Scirocco) was used.

Advantageously in all embodiments of the present invention, the silica furthermore exhibits a pH selected in the range of pH 6 to 8, such as preferably in the range of 7 to 8 (measured as a 1% suspension in distillated water with a standard pH electrode under stirring).

Precipitated silica grades particularly suitable for the purpose of the present invention are e.g. commercially available as Ibersil D-250 from IQE Group, Sipernat 2200 from Evonik, Tixosil 68 from Solvay, Zeofree 5170 from J.M. Huber Cooperation or Newsil C50 from Quechen Silicon Chemical Co Ltd.

The term edible oil refers to oils commonly used in feed applications. Preferred edible oils in all embodiments of the present invention are propyleneglycol, corn oil, rapeseed oil, sunflower oil, middle chain triglyceride (MCT) and glycerol as well as mixtures thereof. Most preferred in all embodiments of the present inventions is the use of propyleneglycol.

The term additive as used herein refers to additives commonly used in the preparation of powderous formulations for feed application such as in particular to thickeners, such as in particular gums or cellulose derivatives such as xanthan gum, karaya gum and/or ethylcellulose.

Preferred embodiments of the present invention are formulations (I) which are formulations (II), which comprise
(i) 1 to 25 wt-%, based on the total weight of the powderous formulation, of a compound of formula (I), and
(ii) 5 to 45 wt-%, based on the total weight of the formulation, of at least one edible oil, and
(iii) at least 30 wt-%, based on the total weight of the powderous formulation, of precipitated silica, and
(iv) 0 to 10 wt-%, based on the total weight of the powderous formulation, of water and/or an additive.

A more preferred embodiment of the present invention relates to a formulation (Ill) consisting of
(i) 2 to 20 wt-%, based on the total weight of the powderous formulation, of a compound of formula (I), and
(ii) 10 to 45 wt-%, based on the total weight of the powderous formulation, of an edible oil, and
(iii) at least 35 wt-%, based on the total weight of the powderous formulation, of precipitated silica, and
(iv) 0 to 10 wt-%, based on the total weight of the powderous formulation, of water and/or an additive.

An especially preferred embodiment of the present invention relates to a formulation (IV) consisting of
(i) 2 to 15 wt-%, based on the total weight of the powderous formulation, of a compound of formula (I), and
(ii) 20 to 40 wt-%, based on the total weight of the powderous formulation, of an edible oil, and
(iii) at least 35 wt-%, based on the total weight of the powderous formulation, of precipitated silica, and
(iv) 0 to 7 wt-%, based on the total weight of the powderous formulation, of water and/or an additive.

A very specific formulation of the present invention is a formulation (V) consisting of
(i) 2 to 15 wt-%, based on the total weight of the powderous formulation, of 3-nitrooxypropanol, and
(ii) 20 to 40 wt-%, based on the total weight of the powderous formulation, of propyleneglycol, and
(iii) at least 38 wt-%, based on the total weight of the powderous formulation, of precipitated silica, and
(iv) 0 to 7 wt-%, based on the total weight of the powderous formulation, of water.

Generally, to produce a powder according to the present invention (formulations (I), (II), (Ill), (IV), (V)) the compound of formula (I) is, optionally diluted in the edible oil and further optionally admixed with the additive(s), sprayed onto or admixed with a precipitated silica according to the present invention.

It is also possible that the compound of formula (I) is, optionally in the presence of an edible oil and further optionally admixed with the additive(s), diluted in an organic solvent suitable for the preparation of food or feed products such as e.g. dichloromethane, sprayed onto or admixed with precipitated silica followed by evaporation of the organic solvent.

The powderous formulation according to the present invention can additionally be coated with customary coatings in the art such as wax or fats. If present, such coating is generally applied in amounts of 5 to 50 wt.-% based on the total weight of the powderous form. Advantageously, the coating comprises at least one wax and/or at least one fat, which has a dropping point of from 30 to 85° C.

The dropping point of a material as used herein refers to the temperature (in ° C.) when the material begins to melt under standardized conditions. Thus the material is heated so long until it changes the state of matter from solid to liquid. The dropping point is the temperature when the first dropping is released from the material. The determination of the dropping point (Tropfpunkt) is carried out as described in the standard norm DIN ISO 2176.

Particularly suitable waxes to be used as coating in the context of the present invention include organic compounds consisting of long alkyl chains, natural waxes (plant, animal) which are typically esters of fatty acids and long chain alcohols as well as synthetic waxes, which are long-chain hydrocarbons lacking functional groups.

Particularly suitable fats to be used as coating in the context of the present invention include a wide group of compounds which are soluble in organic solvents and largely insoluble in water such as hydrogenated fats (or saturated fats) which are generally triesters of glycerol and fatty acids. Suitable fats can have natural or synthetic origin. It is possible to hydrogenate a (poly)unsaturated fat to obtain a hydrogenated (saturated) fat.

Preferred examples of waxes and fats to be used as coating according to the present invention are glycerine monostearate, carnauba wax, candelilla wax, sugarcane wax, palmitic acid, stearic acid hydrogenated cottonseed oil, hydrogenated palm oil and hydrogenated rapeseed oil as well as mixtures thereof.

All the above disclosed formulations (I), (II), (Ill), (IV), (V) preferably are used by suspending (dispersing) the powderous formulation in water, respectively an aqueous composition and then admixing/spraying the respective suspension/dispersion with/onto the feed products.

Thus, the present invention also relates to an aqueous dispersion of a formulation (I), (II), (III), (IV), (V) with all the preferences outlined herein as well as to a method of manufacturing such a dispersion, said method encompassing admixing a formulation (I), (II), (III), (IV), (V) with all the preferences outlined herein with water, respectively an aqueous composition.

Suitably aqueous compositions are all composition comprising water which are suitable to be fed to ruminants. The amount of water in such aqueous composition is preferably at least 50 wt.-%.

Particular suitable aqueous compositions for the dispersion/suspension of the powderous compositions according to the present invention consist essentially of water and glucose syrup. In a preferred embodiment, the ratio (w/w) of water to glucose syrup is furthermore selected in the range of 10:1 to 1 to 5, more preferably in the range of 7:1 to 1:2, most preferably in the range of 5:1 to 1:1.

Additionally, all the above disclosed formulations (I), (II), (Ill), (IV) and (V) can be used directly as a dispersion/suspension in water or as an aqueous composition as defined above to be fed to the respective animal.

The invention is illustrated by the following Examples. All temperatures are given in ° C. and all parts and percentages are related to the weight.

EXAMPLES

Example 1 Preparation of the Powderous Silica Formulations

To 100 g of 20 wt.-% 3-nitrooxypropanol solution in propyleneglycol in a 500 ml Schott bottle 0.2 g Amaranth (to facilitate the visual evaluation) is added under agitation.

Afterwards 5 g of the 3-nitrooxypropanol-Amaranth solution prepared as outlined above was added under gentle agitation to 5 g of the respective silica as outlined in table 1, which was placed on a beaker at RT (±20° C.). After 5 minutes agitation, the adsorption is completed and a free flowing powder is obtained. The powderous formulations are then allowed to stay at RT for another hour before use.

Example 2: Dispersability Study in Water

To 20 g of distilled water placed on a 25 mL beaker (surface area: 774 mm$^2$) ½ spoon of the respective powderous silica formulation as outlined in example was added. Afterwards, the surface covered by the silica particles was determined by placing a grid (0.5 cm*0.5 cm) at the bottom of the beaker.

As can be retrieved from table 1, the powderous silica formulation 1-4 led to a more homogeneous surface coverage of the respective silica particles compared to the fumed silica particles.

TABLE 1

| | Silica formulation | | Surface coverage |
|---|---|---|---|
| # | Tradename | Silica type | [mm$^2$] |
| 1 Inv | Newsil C50 | Precipitated | 250 |
| 2 Inv | Sipernat 2200 | Precipitated | 300 |
| 3 Inv | Ibersil D-250 | Precipitated | 250 |
| 4 Inv | Tixosil 68 | Precipitated | 225 |
| 1 Ref | Aeroperl 300 Pharma (Evonik) | Fumed | 125 |
| 2 Ref | Aeroperl 300/30 (Evonik) | Fumed | 112.5 |

Example 2: Dispersability Study in a Glucose Syrup Mixture

To imitate the behaviour of the powderous formulation according to the present invention in a viscous medium such as molasses, a common feed additive, the distribution of a powderous formulation according to the present invention in two glucose syrup mixture having different viscosities was investigated. The viscosities were determined using a Brookfield DV-II Pro equipped with a spindle 2. The rpm applied were selected to get a minimum torque value of 10% after immersion of the spindle in 120 mL of the glucose syrup mixture placed in a 150 mL beaker.

Glucose syrup mixture I: to 100 g of distilled water placed in a 250 mL beaker 100 g glucose syrup (type 4280 supplied by Roquette) is added under agitation to obtain a glucose syrup mixture having a viscosity of 31.3 mPas at 50 rpm and 24.2° C. (torque: 41.8%).

Glucose syrup mixture II: to 131.25 g of distilled water placed in a 250 mL beaker 43.75 g glucose syrup (type 4280 supplied by Roquette) was added under agitation to obtain a glucose syrup mixture having a viscosity of 156 mPas at 4 rpm and 26.3° C. (torque 16.7%).

To 45 g of the above described glucose syrup mixtures 0.5 g of a powderous formulation prepared as outline in example 1 was added. As can be retrieved from table 2 and 3, only the powderous formulation according to the present invention lead to a homogeneous distribution of the silica particles in the glucose syrup mixture, whereas the fumed silica particles significantly aggregated, respectively resulted in the formation of lumps.

TABLE 2

| Distribution in glucose syrup mixture I | | | |
|---|---|---|---|
| | Silica formulation | | Visual evaluation (Distribution in glucose |
| # | Tradename | Silica type | syrup mixture I) |
| 5 Inv | Newsil C50 | Precipitated | Homogeneous |
| 3 Ref | Aeroperl 300 Pharma | Fumed | Aggregation, lump formation |
| 4 Ref | Aeroperl 300/30 | Fumed | Aggregation, lump formation |

TABLE 3

| Distribution in glucose syrup mixture II | | | |
|---|---|---|---|
| | Silica formulation | | Visual evaluation (Distribution in glucose |
| # | Tradename | Silica type | syrup mixture II) |
| 6 Inv | Newsil C50 | Precipitated | Homogeneous |
| 5 Ref | Aeroperl 300 Pharma | Fumed | Aggregation, lump formation |
| 6 Ref | Aeroperl 300/30 | Fumed | Aggregation, lump formation |

The invention claimed is:
1. A water dispersible powderous formulation comprising:
(i) at least 0.1 weight-% (wt-%), based on the total weight of the powderous formulation, of a compound of formula (I):

formula (I)

wherein n is an integer from 1 to 15,

R$^1$ is H, C$_1$-C$_6$alkyl, phenyl, —OH, —NH$_2$, —CN, —COOH, —O(C=O)R$^8$, —NHC(=O)R$^8$, SO$_2$NHR$^8$ or —ONO$_2$, and R$^8$ is C$_1$-C$_6$alkyl, phenyl or pyridyl, with the proviso that when n is >3 the hydrocarbon chain may be interrupted by —O or NH, (ii) 0 to 40 wt-%, based on the total weight of the powderous formulation, of an edible oil, and (iii) at least 25 wt-%, based on the total weight of the powderous formulation, of precipitated silica.

2. The water dispersible powderous formulation according to claim 1 further comprising:

(iv) 0 to 10 wt-%, based on the total weight of the powderous formulation, of water and/or an additive.

3. The water dispersible powderous formulation according to claim 2, wherein the additive comprises at least one thickener selected from the group consisting of gums and cellulose derivatives.

4. The water dispersible powderous formulation according to claim 3, wherein the at least one thickener is selected from the group consisting of xanthan gum, karaya gum and ethylcellulose.

5. The water dispersible powderous formulation according to claim 1 consisting of:

(i) 2 to 20 wt-%, based on the total weight of the powderous formulation, of the compound of formula (I), (ii) 10 wt-% to 45 wt-%, based on the total weight of the powderous formulation, of the edible oil, (iii) at least 35 wt-%, based on the total weight of the powderous formulation, of the precipitated silica, and (iv) 0 to 10 wt-%, based on the total weight of the powderous formulation, of water and/or an additive.

6. The water dispersible powderous formulation according to claim 1, wherein n is an integer between 3 and 9 and R$^1$ is OH, COOH or —ONO$_2$.

7. The water dispersible powderous formulation according to claim 1, wherein the compound of formula (I) is selected from the group consisting of 3 nitrooxypropanol, 9 nitrooxynonanol, 5 nitrooxy pentanoic acid, 6 nitrooxy hexanoic acid, bis(2 hydroxyethyl)amine dinitrate, 1,4-bis-nitrooxybutane and 1,5-bis-nitrooxypentane.

8. The water dispersible powderous formulation according to claim 1, wherein the edible oil is selected from the group consisting of propyleneglycol, corn oil, rapeseed oil, sunflower oil, middle chain triglyceride, glycerol and mixtures thereof.

9. The water dispersible powderous formulation according to claim 1, wherein the edible oil is propyleneglycol.

10. The water dispersible powderous formulation according to claim 1 consisting of:

(i) 2 to 15 wt-%, based on the total weight of the powderous formulation, of 3-nitrooxypropanol, (ii) 20 to 40 wt-%, based on the total weight of the powderous formulation, of propyleneglycol, (iii) at least 38 wt-%, based on the total weight of the powderous formulation, of the precipitated silica, and (iv) 0 to 7 wt-%, based on the total weight of the powderous formulation, of water.

11. The water dispersible powderous formulation according to claim 1, wherein the particle size D(v, 0.5) of the precipitated silica is in a range of 200 μm to 400 μm.

12. The water dispersible powderous formulation according to claim 1, wherein the powderous formulation contains an additional coating.

13. The water dispersible powderous formulation according to claim 12, wherein the coating is selected from the group consisting of glycerine monostearate, carnauba wax, candelilla wax, sugarcane wax, palmitic acid, stearic acid hydrogenated cottonseed oil, hydrogenated palm oil, hydrogenated rapeseed oil and mixtures thereof.

14. The water dispersible powderous formulation according to claim 1, wherein R$^8$ is 2-pyridyl.

15. An aqueous dispersion which comprises water and the powderous formulation according to claim 1 dispersed in the water.

16. A feed product comprising the aqueous dispersion according to claim 15.

17. A feed product comprising the powderous formulation according to claim 1.

* * * * *